(12) United States Patent
Furuya

(10) Patent No.: US 8,035,828 B2
(45) Date of Patent: Oct. 11, 2011

(54) APPARATUS, METHOD, AND PROGRAM PRODUCT USING SAME WINDOW FOR DESIGNATING PRINT SETTINGS FOR ENTIRE PRINT JOB AND SPECIFIC PAGES

(75) Inventor: Tomoyuki Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1062 days.

(21) Appl. No.: 11/855,116

(22) Filed: Sep. 13, 2007

(65) Prior Publication Data
US 2008/0144088 A1 Jun. 19, 2008

(30) Foreign Application Priority Data
Dec. 19, 2006 (JP) ................................. 2006-341941

(51) Int. Cl.
*G06F 3/12* (2006.01)
*G06F 3/048* (2006.01)
(52) U.S. Cl. ........................ 358/1.13; 358/1.15; 715/781
(58) Field of Classification Search .................... 358/1.9, 358/1.13, 1.15, 1.18, 442, 468; 715/274, 715/781
See application file for complete search history.

(56) References Cited

U.S. PATENT DOCUMENTS

| | | | |
|---|---|---|---|
| 7,057,754 B1 | 6/2006 | Tsuchiya et al. | |
| 7,701,603 B2 * | 4/2010 | Nakayama | 358/1.15 |
| 2004/0046797 A1 | 3/2004 | Perry | |
| 2004/0061897 A1 | 4/2004 | Onishi | |
| 2007/0002352 A1* | 1/2007 | Ushio et al. | 358/1.13 |
| 2007/0296995 A1* | 12/2007 | Sakura | 358/1.13 |
| 2008/0106755 A1* | 5/2008 | Morooka | 358/1.15 |
| 2008/0144088 A1* | 6/2008 | Furuya | 358/1.15 |
| 2009/0262396 A1* | 10/2009 | Furuya | 358/1.15 |

FOREIGN PATENT DOCUMENTS

| | | |
|---|---|---|
| EP | 1195266 A2 | 4/2002 |
| JP | 7081186 | 3/1995 |
| JP | 2001075687 | 3/2001 |
| JP | 2001180083 | 7/2001 |
| JP | 2001249787 | 9/2001 |
| JP | 2004046774 | 2/2004 |
| JP | 2004-126871 | 4/2004 |
| JP | 2005316835 | 11/2005 |
| JP | 2007328516 A * | 12/2007 |

OTHER PUBLICATIONS

Office Action dated Aug. 24, 2007 in JP 2004-171765.
Korean Office Action dated Jun. 26, 2009 in corresponding Korean Application No. 10-2007-0098449.
Chinese Office Action dated Jun. 26, 2009 in corresponding Chinese Application No. 2007101523976.
European Search Report dated Apr. 8, 2010, concerning the corresponding European Patent Application No. 07116758.9.

* cited by examiner

*Primary Examiner* — Scott A Rogers
(74) *Attorney, Agent, or Firm* — Fitzpatrick, Cella, Harper & Scinto

(57) ABSTRACT

An information processing apparatus which creates print data includes a common setting unit which accepts change of a print setting to the entire print data via a print setting window for making a print setting, and stores the print setting, a display control unit which, when change of a print setting is designated, displays a page designation window for designating page information to which the change of the print setting accepted via the print setting window is applied, and a specific page setting unit which generates exceptional page setting information based on a combination of the page information designated via the page designation window and the print setting accepted via the print setting window. The print setting window accepts, within the same window, change of a print setting to the entire print data and change of a print setting to specific page information.

11 Claims, 15 Drawing Sheets

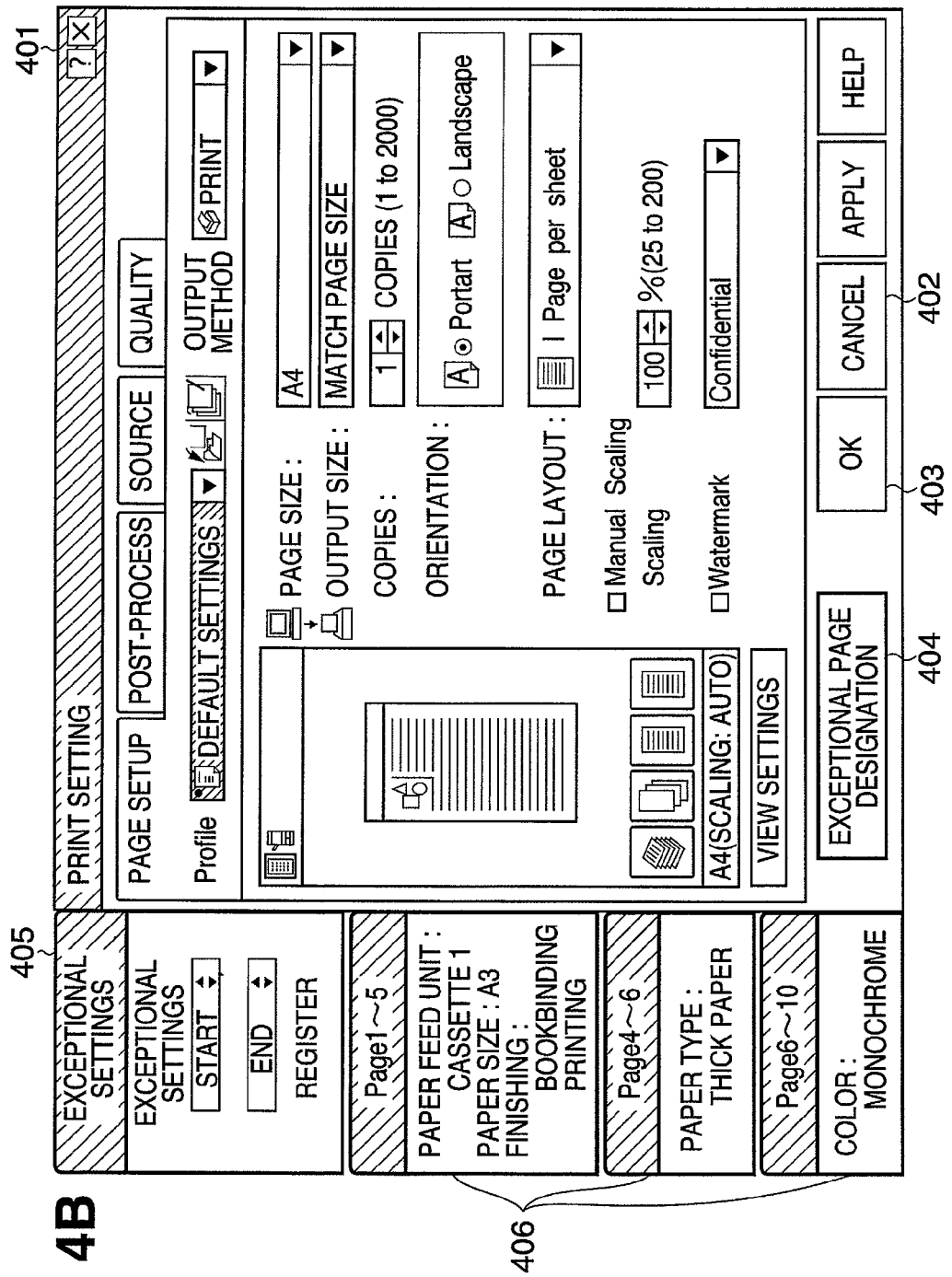
F I G. 4B

APPARATUS, METHOD, AND PROGRAM PRODUCT USING SAME WINDOW FOR DESIGNATING PRINT SETTINGS FOR ENTIRE PRINT JOB AND SPECIFIC PAGES

BACKGROUND OF THE INVENTION

1. Field of the Invention

The present invention relates to a printing apparatus control technique.

2. Description of the Related Art

These days, MFPs (Multi Function Peripheral) having print, facsimile, and copy functions are gaining advanced functions to perform various processes in printing. For example, MFPs can execute integration processing such as N-up to integrate a plurality of pages into one sheet in printing, additional information (e.g., watermark) processing, stapling, bookbinding processing, and color processing.

In the POD (Print On Demand) business field, various print settings are demanded in small-volume printing, and it is required to create sophisticated printed materials using a high-end printing apparatus. These print settings include a setting to add additional information to only an arbitrary page, and a setting to chapter a whole document and staple each chapter.

In general, a control program (printer driver) which controls a printing apparatus cannot grasp in advance the whole structure of a document to be printed, and sets processing functions for the entire document. To create a sophisticated printed material by adding additional information to only an arbitrary page, the printer driver must cooperate with an application which grasps an entire document.

For example, when a print setting is made to chapter one document, settings desired by a user for each chapter can be attained by dividing one document into a plurality of documents formally corresponding to chapters and making print settings for each document.

A user selectively uses an application according to the application purpose. When a user utilizes an application which cannot make print settings for each page, he cannot obtain a desired sophisticated printed material. It is difficult to finely control a printing apparatus via an application, and the ability of the printing apparatus cannot be fully exploited.

To solve this problem, there has been proposed a technique of designating functions for each page via the user interface of a printer driver (see, e.g., Japanese Patent Laid-Open No. 2005-316835). According to Japanese Patent Laid-Open No. 2005-316835, an exceptional setting or function is designated for each page, unlike normal settings of an entire print document. Japanese Patent Laid-Open No. 2005-316835 discloses a mechanism of designating settings different from those of an entire document in association with a page number.

Based on this mechanism, the printer driver can designate common print settings of a printing apparatus and exceptional print settings of a specific page regardless of an application.

However, functional development of printing apparatuses and an increase in the number of setting items by printer drivers lead to poor operability. It is difficult for a user to grasp exceptional settings different from common print settings.

There is available a printer driver called a family driver for creating a plurality of printing apparatus drivers with the same source codes. This printer driver must cope with both a printing apparatus capable of exceptional page settings and a printing apparatus incapable of exceptional page settings. When viewed from the development of printer drivers, complicated exceptional settings decrease the development efficiency.

SUMMARY OF THE INVENTION

The present invention has been made to overcome the conventional drawbacks, and has as its object to provide a technique which exhibits high operability for the print settings of page and allows a user to easily grasp the result of change.

It is another object of the present invention to provide a technique capable of increasing the development efficiency of a print control program by commonly using an interface aiming at the print settings of entire print data for the print settings of page.

According to one aspect of the present invention, there is provided an information processing apparatus which creates print data to be processed by a printing apparatus, comprising:

a common setting unit adapted to accept change of a print setting to the entire print data via a print setting window for making a print setting, and store the print setting as common setting information;

a display control unit adapted to, when change of a print setting is designated via the print setting window for page of the print data, display a page designation window for designating page information to which the change of the print setting accepted via the print setting window is applied; and a specific page setting unit adapted to generate exceptional page setting information based on a combination of the page information designated via the page designation window and the print setting accepted via the print setting window, wherein the print setting window accepts, within the same window, change of a print setting to the entire print data and change of a print setting to specific page information.

According to another aspect of the present invention, there is provided a control method of creating print data to be processed by a printing apparatus, comprising:

a common setting step of causing a common setting unit to accept change of a print setting to the entire print data via a print setting window for making a print setting, and store the print setting as common setting information;

a display control step of, when change of a print setting is designated via the print setting window for page of the print data, causing a display control unit to display a page designation window for designating page information to which the change of the print setting accepted via the print setting window is applied; and a specific page setting step of causing a specific page setting unit to generate exceptional page setting information based on a combination of the page information designated via the page designation window and the print setting accepted via the print setting window, wherein the print setting window accepts, within the same window, change of a print setting to the entire print data and change of a print setting to specific page information.

The present invention can provide a technique which exhibits high operability for the print settings of page and allows a user to easily grasp the result of change.

The present invention can also increase the development efficiency of a control program by commonly using an interface aiming at the print settings of entire print data for the print settings of page.

Further features of the present invention will become apparent from the following description of exemplary embodiments (with reference to the attached drawings).

BRIEF DESCRIPTION OF THE DRAWINGS

FIGS. 4A and 4B are views showing a common setting user interface 401, and an exceptional page setting user interface 405 and subwindow (UI) 406 displayed when the user designates an exceptional page designation button 404;

DESCRIPTION OF THE EMBODIMENTS

Preferred exemplary embodiments of the present invention will now be described in detail with reference to the accompanying drawings. It should be noted that constituent elements set forth in these embodiments are merely examples. The technical scope of the present invention is determined by the scope of claims, and is not limited by each embodiment below.

First Embodiment

Figure 1:
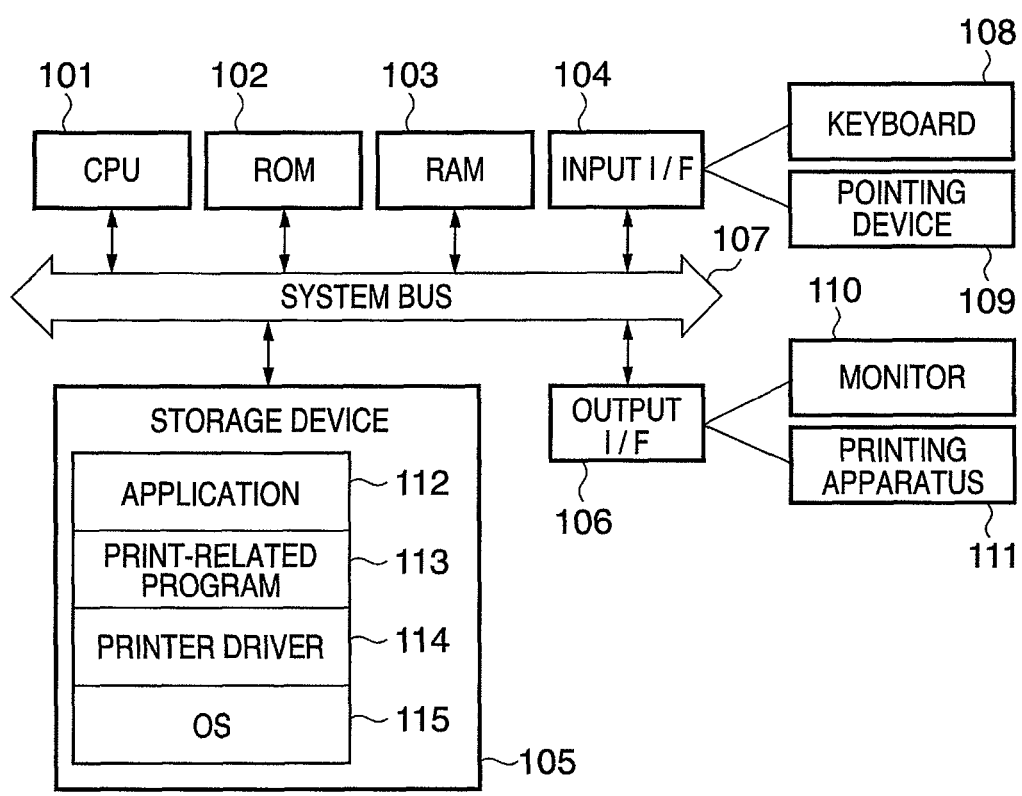
FIG. 1 is a block diagram showing a configuration of an information processing system to which the control program and user interface of a printing apparatus are applied.

FIG. 1 is a block diagram showing, as a typical multifunction peripheral having print, facsimile, and copy functions, a configuration of a system to which the control program and user interface of a printing apparatus are applied.

The present invention is applicable to even a system with a single function, a system made up of a plurality of devices, and a system connected via a network such as a LAN or WAN as long as the control program can be executed.

In FIG. 1, a CPU 101 controls the overall printing apparatus in accordance with a control program stored in a ROM 102, RAM 103, or storage device 105. The RAM 103 is also available as a work area when the CPU 101 performs various processes. The storage device 105 stores an operating system (OS) 115, application 112, print-related program 113, and printer driver 114.

A keyboard 108 and a pointing device 109 such as a mouse (they will also be generally referred to as an "input device") are devices used when the user issues a variety of instructions to a computer (information processing apparatus) via an input I/F 104. An output I/F 106 is an interface for externally outputting data processed by the CPU 101 of the computer (information processing apparatus), and outputs data to a monitor 110 and printing apparatus 111. The printing apparatus 111 may be connected not only via a local I/O but also via a network. A system bus 107 is used to exchange data within the computer (information processing apparatus).

Figure 2:
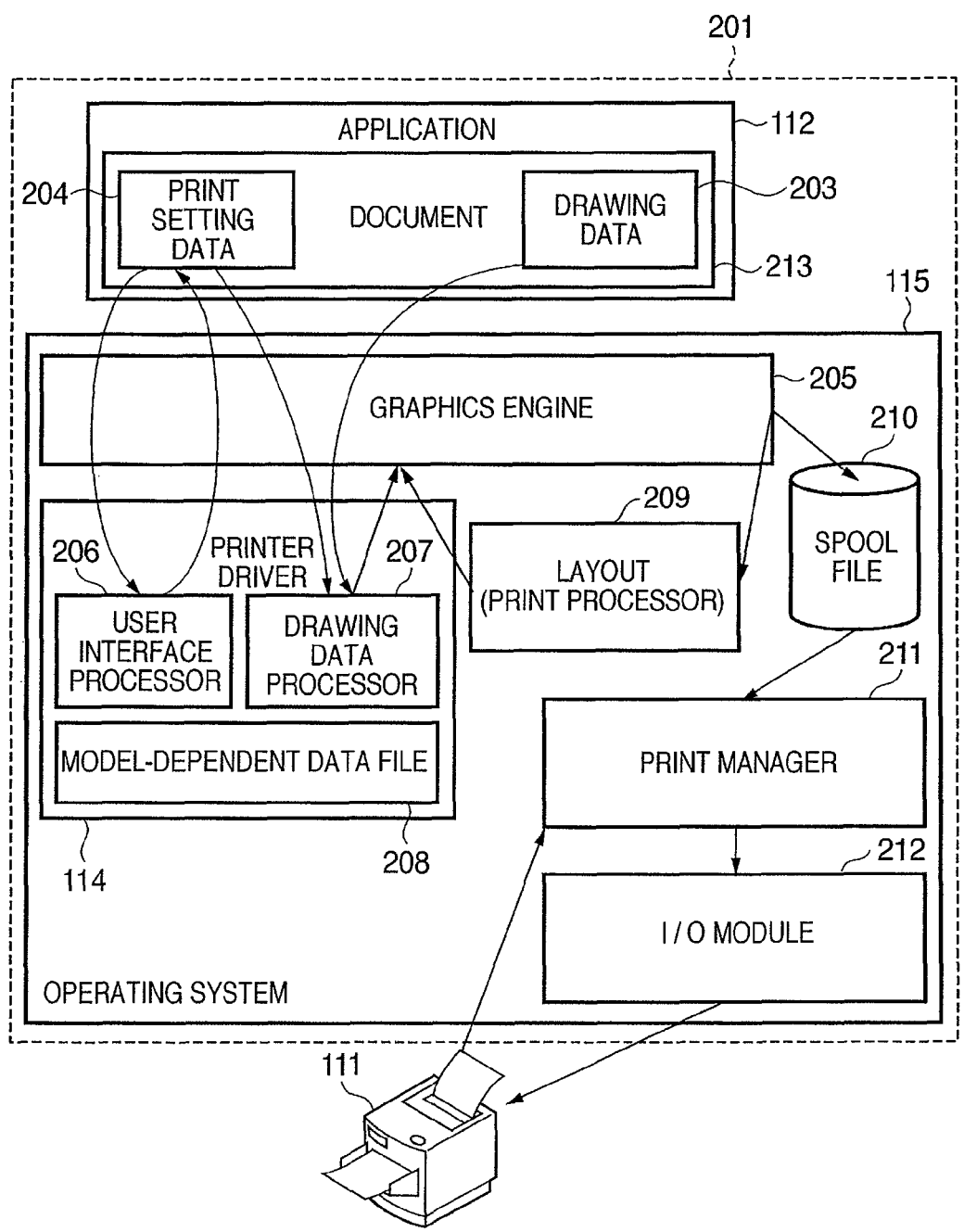
FIG. 2 is a block diagram showing the information processing system using an information processing apparatus.

FIG. 2 is a block diagram showing an information processing system using a computer (information processing apparatus) 201. The user can make print settings using an input device such as the keyboard 108 or pointing device 109 (e.g., mouse). The user can make print settings from the user interface window of the application 112 displayed on the monitor 110 connected to the output I/F 106, and can print created document data (to be simply referred to as a "document" hereinafter) 213. Print processing of the document 213 is executed by sequentially performing three processes: printer selection, print setting creation, and drawing data conversion.

As printer selection, the printer driver 114 corresponding to a printer which prints the document 213 is selected under the control of the CPU 101.

Then, print setting data 204 for printing the document 213 is created. A user interface processor 206 of the printer driver 114 creates the initial values of the print setting data 204. The print setting data 204 having the initial values is so changed as to obtain a final print result desired by the user by using the user interface processor 206 of the printer driver 114 in accordance with a print setting change instruction. For example, paper is changed from an initial setting "A4" to "A5", or printing is changed from an initial setting "single-sided printing" to "double-sided printing".

The print setting data 204 is saved in two formats: one is a binary data structure called DEVMODE, and the other is text data called a print ticket in the markup language XML using tags. The data format in save changes depending on the specifications of the printer driver 114 and operating system 115.

Subsequently, drawing data 203 is converted. After the end of creating the print setting data 204, the user executes print processing. The application 112 notifies the operating system 115 of print processing under the control of the CPU 101. The operating system 115 sends the drawing data 203 to the designated printer driver 114 via a graphics engine 205.

When the print setting data 204 designates layout processing, a temporary spool file 210 is created to activate a layout module 209 (print processor) before sending the drawing data 203 to the printer driver 114.

The layout processing means processing to change the page order of the document 213 or integrate a plurality of pages into one sheet. After changing the page order or the layout of pages to be integrated into one sheet, the layout module 209 sends the drawing data 203 to the printer driver 114.

Upon receiving the drawing data 203, the printer driver 114 causes a drawing data processor 207 to convert the drawing data 203 into a data language understandable by the printing apparatus 111, i.e., printer control language (print data). At this time, the drawing data processor 207 also converts the print setting data 204 into a printer control language (print data).

Both the user interface processor 206 and drawing data processor 207 are configured as modules common to a plurality of types of printing apparatuses 111, and the difference between models is described in a model-dependent data file 208.

The user interface processor 206 and drawing data processor 207 can refer to the model-dependent data file 208, as needed. Print data converted by the drawing data processor 207 are sequentially stored in the spool file 210. Upon completion of converting all drawing data, a print manager 211 acquires the spool file 210 and holds it as a print job file (functions as a spooler). The print manager 211 functions as a job scheduler, and manages the schedule of print processing. If the print manager 211 receives information representing a printable state from the printing apparatus 111, it determines that the printing apparatus 111 can print, and transmits print job data to the printing apparatus 111 via an I/O module 212.

(Arrangement of User Interface Processor 206)

Figure 3:
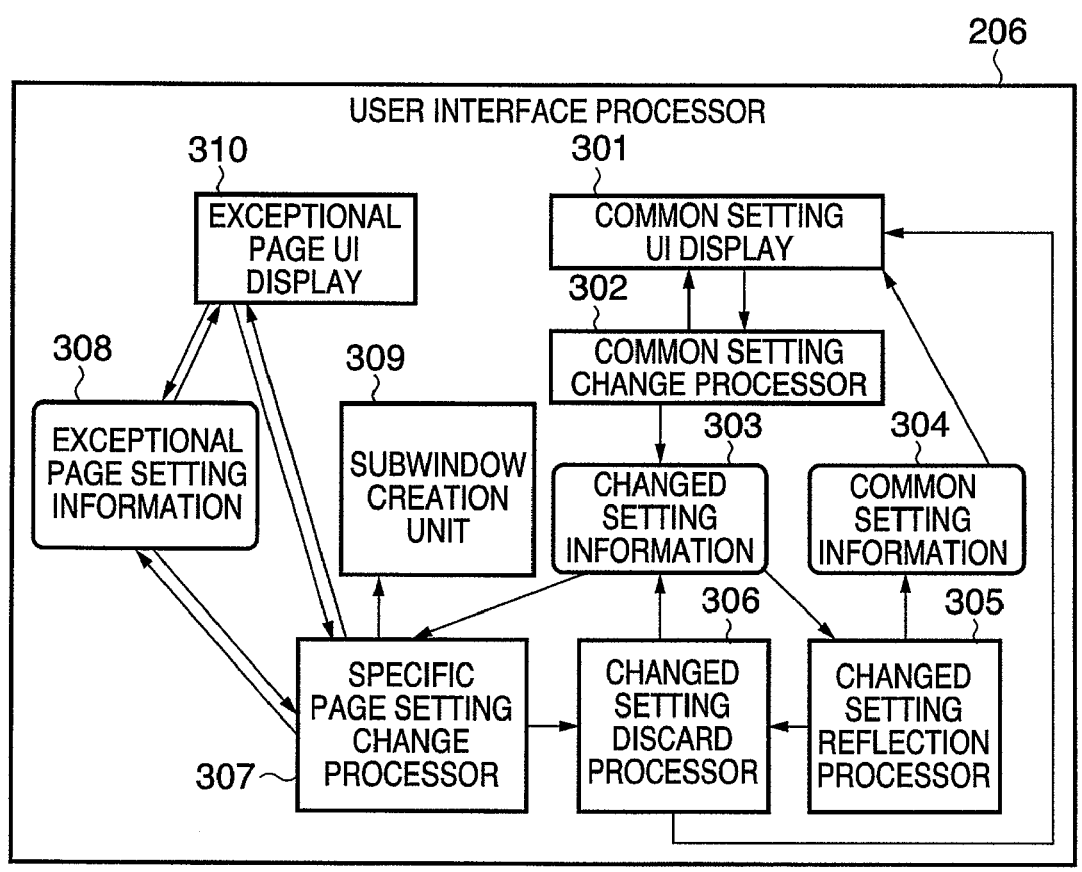
FIG. 3 is a block diagram showing the concrete arrangement of a user interface processor 206 of a printer driver 114.
Figure 4A:
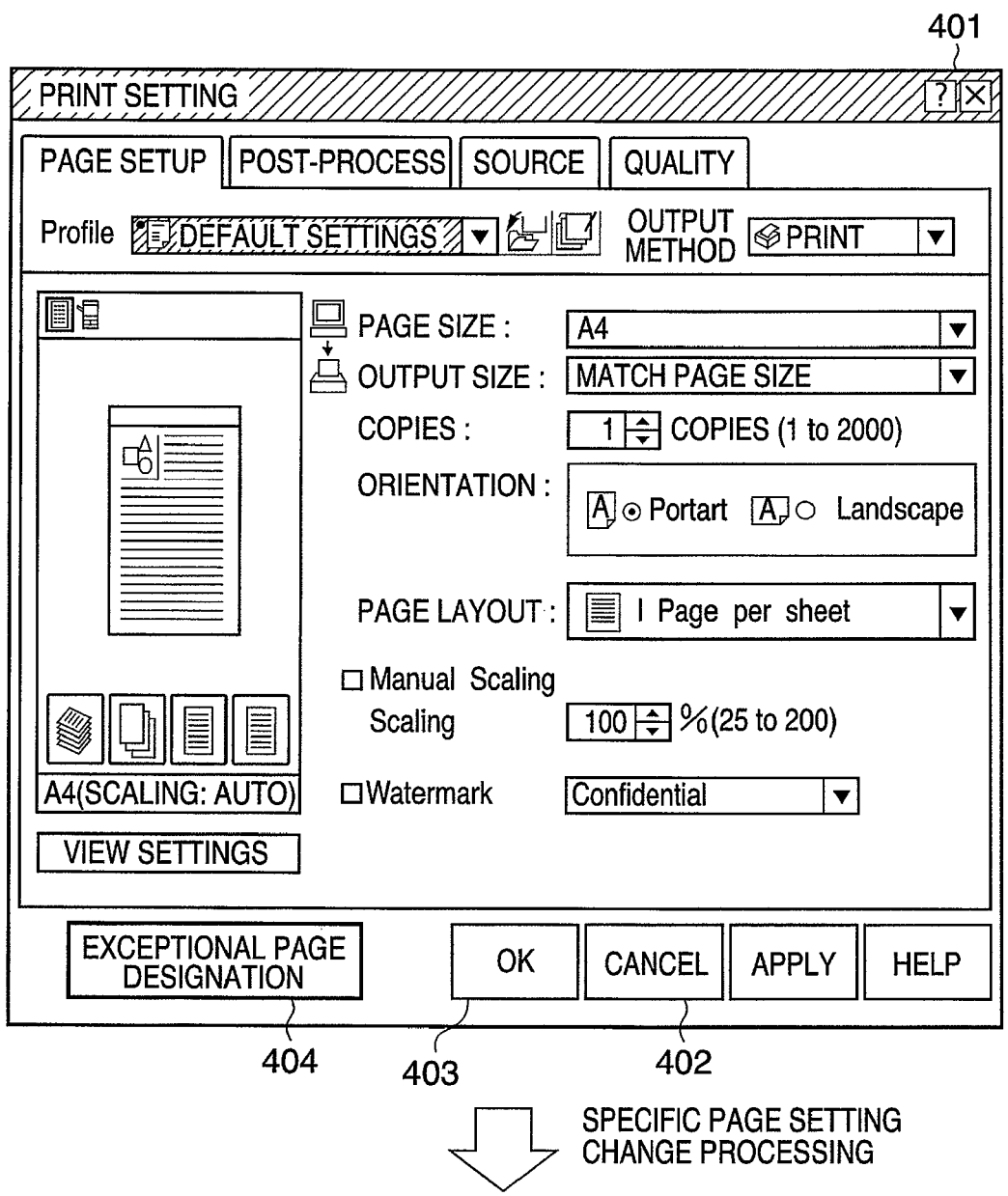

FIG. 3 is a block diagram showing the concrete arrangement of the user interface processor 206 of the printer driver 114. FIGS. 4A and 4B are views showing a common setting user interface 401, and an exceptional page setting user interface 405 and subwindow (UI) 406 displayed when the user designates an exceptional page designation button 404.

The user interface processor 206 receives an instruction from the application 112 to change the print setting data 204. A common setting UI display 301 which manages the print settings of an entire document (print data) displays the user interface (UI) of the printer driver 114 on the monitor 110 together with initial values which are settings based on common setting information 304 saved in advance. Assume that the common setting information 304 contains the print settings of the entire document (print data).

The user interface displayed at this time will be called a "common setting user interface" in order to discriminate it from a user interface for making exceptional print settings for each page, which will be described later.

The user interface for making exceptional print settings for each page will be called an "exceptional page setting user interface".

If the user changes the print setting data 204 via the common setting user interface, a common setting change processor 302 accepts the change contents. The common setting change processor 302 saves the change contents as changed setting information 303 in the storage device 105.

If the user presses an OK button 403 shown in FIGS. 4A and 4B after changing the print setting data 204, the changed setting information 303 becomes valid as the settings of the printer driver 114. After the user presses the OK button 403, a changed setting reflection processor 305 acquires the changed setting information 303 and reflects it in the common setting information 304. If the user does not change the print setting data 204, no changed setting information 303 exists, and the changed setting reflection processor 305 does not reflect it in the common setting information 304.

If the user changes the print setting data 204 but does not want to validate the change as the settings of the printer driver, he must press a cancel button 402 shown in FIGS. 4A and 4B. After press of the cancel button 402, a changed setting discard processor 306 discards the changed setting information 303. The changed setting discard processor 306 instructs the common setting UI display 301 to display the common setting user interface 401 reflecting the common setting information 304.

Since the common setting information 304 does not reflect the changed setting information 303, the common setting user interface 401 reflecting the common setting information 304 returns to a state before the change. That is, the change of print settings by the user via the common setting user interface becomes invalid. If the user does not change print settings and no changed setting information 303 exists, the changed setting discard processor 306 need not do any processing.

(Display Example of User Interface)

In FIGS. 4A and 4B, the common setting user interface 401 is a user interface for making the print settings of entire print data of the document 213 which is generated by the application 112 and is to be printed by the user. The common setting UI display 301 displays the common setting user interface 401 on the monitor 110 on the basis of the common setting information 304.

Processing to perform print settings different from common print settings for each page will be called "exceptional page processing", and a function to execute exceptional page processing will be called an "exceptional page processing function".

The common setting user interface 401 can be shared between a printer driver for a high-end printing apparatus having the exceptional page processing function, and a printer driver for a low-end printing apparatus having no exceptional page processing function.

The common setting user interface 401 of a printing apparatus having the exceptional page processing function displays the exceptional page designation button 404. Only when the user presses the exceptional page designation button 404, a specific page setting change processor 307 executes exceptional page processing for a designated page.

The common setting user interface 401 of a printing apparatus having no exceptional page processing function does not display the exceptional page designation button 404.

By sharing the common setting user interface 401, the printer driver development efficiency rises. Also when the user makes exceptional page settings, he can discriminate the difference between common settings and exceptional page settings and easily grasp the exceptional page settings.

If the user has changed the print settings of items (e.g., page size, number of copies, and page layout) via the common setting user interface 401, the common setting change processor 302 stores the changed settings as the changed setting information 303.

If the user presses the OK button 403 in the presence of the changed setting information 303, the changed setting reflection processor 305 starts up. The changed setting reflection processor 305 reflects the changed setting information 303 in the common setting information 304 serving as print settings common to the entire print data (entire page) of the document 213.

If the user presses the cancel button 402 in the presence of the changed setting information 303, the changed setting discard processor 306 starts up. The changed setting discard processor 306 discards the changed setting information 303, and the common setting user interface 401 returns to a state reflecting the common setting information 304 before the change.

Figure 5:
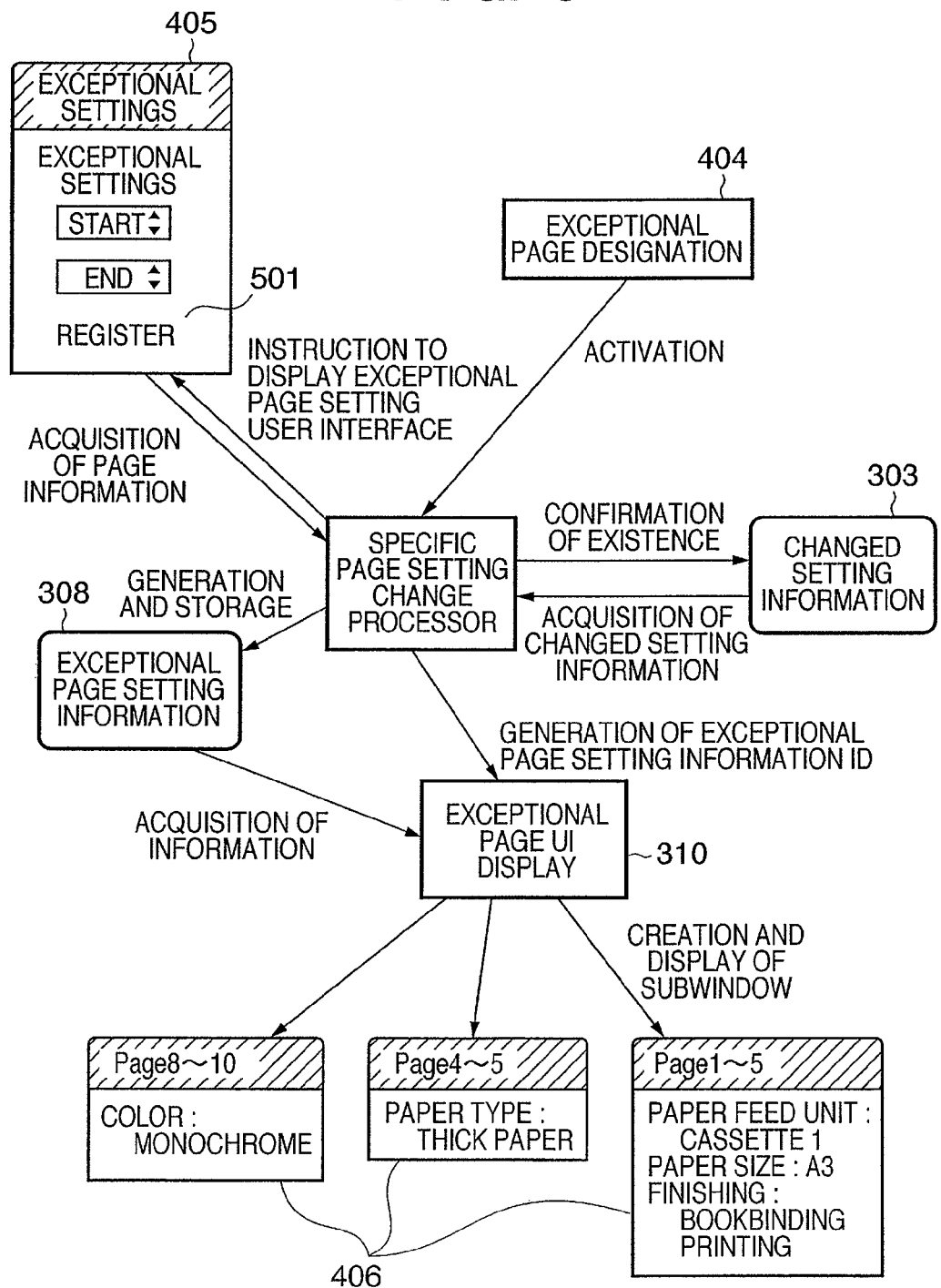
FIG. 5 is a view for explaining the processing sequence of a specific page setting change processor.

Processing by the specific page setting change processor 307 when the user presses the exceptional page designation button 404 in the presence of the changed setting information 303 will be explained in detail later with reference to FIG. 5.

(Processing Sequence of Print Setting Change Processing in Control Program)

Figure 13:
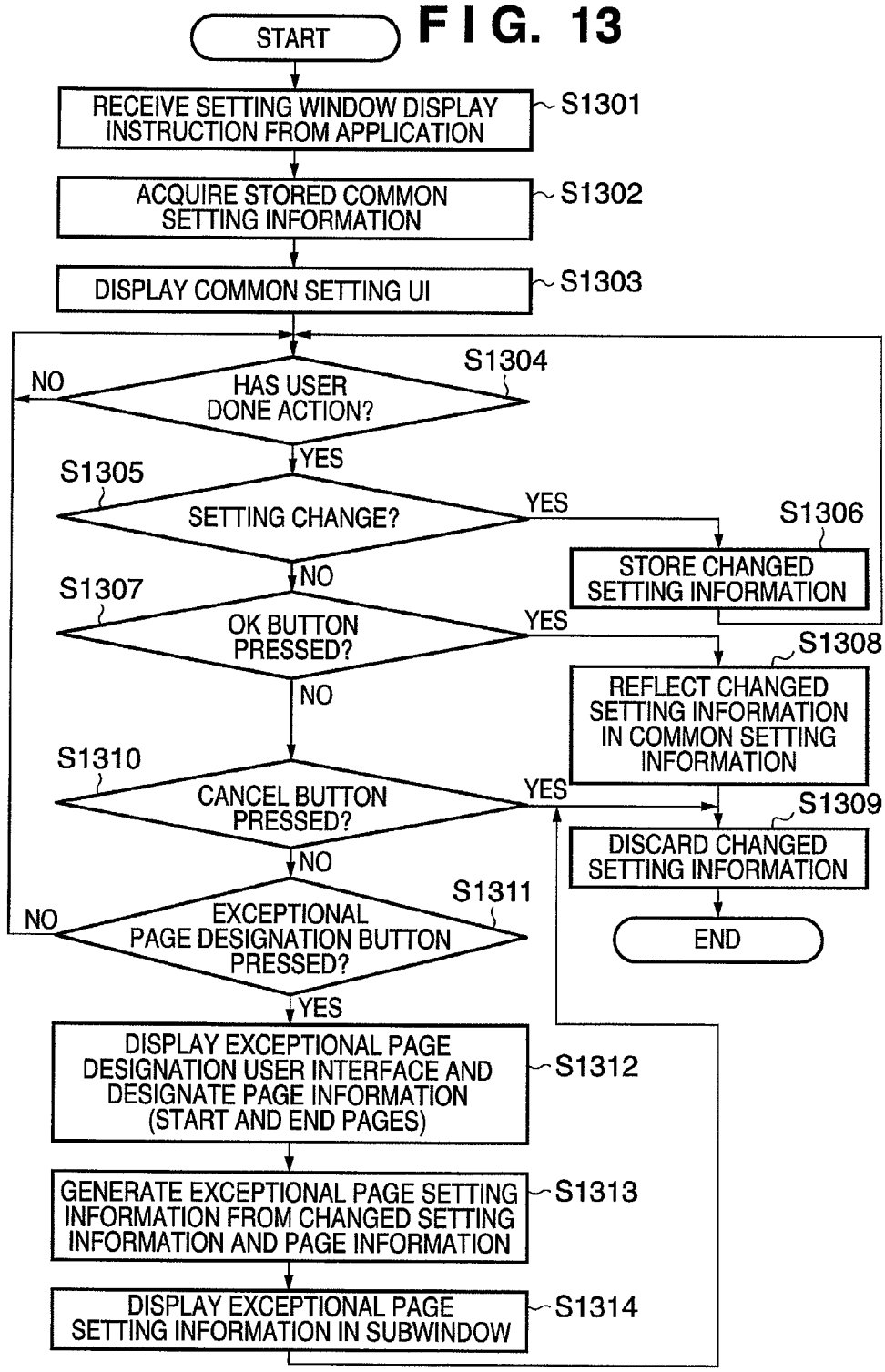
FIG. 13 is a flowchart for explaining the processing sequence of print setting change processing in the control program of the printing apparatus.

FIG. 13 is a flowchart for explaining the processing sequence of print setting change processing in the control program of the printing apparatus. This processing is executed on the basis of processes by the building components of the user interface processor 206 under total control of the CPU 101.

In step S1301, the user interface processor 206 of the printer driver 114 receives a setting window display instruction from an application.

In step S1302, the common setting UI display 301 of the user interface processor 206 starts up and acquires the common setting information 304 stored in advance. The acquired common setting information 304 can be one which is temporarily stored in advance in a file, the RAM 103, or the like and contains the setting values of items saved in advance.

In step S1303, the common setting UI display 301 displays the common setting user interface 401.

In step S1304, the process waits for an action input from the user while displaying the common setting user interface 401. If the user performs an input operation (YES in S1304), the common setting change processor 302 is activated via the common setting UI display 301.

If the input operation by the user is a setting change of an item in step S1305 (YES in S1305), the common setting change processor 302 stores the setting change information as the changed setting information 303 in the storage device 105 (S1306).

The process returns to step S1304 and waits until the user performs an input operation (S1304).

If the input operation by the user is press of the OK button 403 meaning that the setting change is to be reflected in the settings of entire print data (all pages of print data) of the document 213 (NO in S1305 and YES in S1307), the changed setting reflection processor 305 starts up, and reflects the changed setting information 303 in the common setting information 304. Further, the changed setting reflection processor 305 activates the changed setting discard processor 306. The changed setting discard processor 306 discards (deletes) the changed setting information 303 (S1309), and the process ends.

If the input operation by the user is press of the cancel button 402 meaning that no setting change is to be reflected in the settings of entire print data of the document 213 (YES in S1310), the changed setting discard processor 306 starts up. The changed setting discard processor 306 discards (deletes) the changed setting information 303 (S1309), and the process ends.

If the input operation by the user is not press of the exceptional page designation button 404 (NO in S1311), the process returns to step S1304 and waits for an operation input from the user.

If the input operation by the user is press of the exceptional page designation button 404 (NO in S1310 and YES in S1311), the specific page setting change processor 307 starts up, and checks whether the changed setting information 303 exists. If the changed setting information 303 exists, the specific page setting change processor 307 instructs an exceptional page user interface display 310 to display the exceptional page setting user interface 405. The exceptional page user interface display 310 displays the exceptional page setting user interface 405 on the basis of the instruction from the specific page setting change processor 307.

The user designates, via the exceptional page setting user interface 405, the start and end pages for reflecting the changed setting information 303 (S1312). Then, the process advances to step S1313.

In step S1313, the specific page setting change processor 307 generates exceptional page setting information 308 from the changed setting information 303 and the designated page information.

In step S1314, the specific page setting change processor 307 instructs a subwindow creation unit 309 to display the subwindow (UI) 406. The subwindow creation unit 309 creates the subwindow (UI) 406 in accordance with the instruction from the specific page setting change processor 307, and displays it on the monitor 110. The exceptional page user interface display 310 displays the exceptional page setting information 308 in the subwindow (UI) 406.

The process returns to step S1309, and the specific page setting change processor 307 activates the changed setting discard processor 306. The changed setting discard processor 306 discards (deletes) the changed setting information 303 as in the case of press of the cancel button 402. Then, the process ends.

Upon completion of all the setting change processing for the setting change, the setting window display instruction is completed. The application 112 receives the created common setting information and exceptional page setting information as the print setting data 204. In printing, the application 112 transfers the print setting data 204 together with the drawing data 203 to the printer driver 114. The printer driver 114 causes the printing apparatus 111 to process print data on the basis of the print setting data 204.

(Description of Specific Page Setting Change Processor 307)

Figure 7:
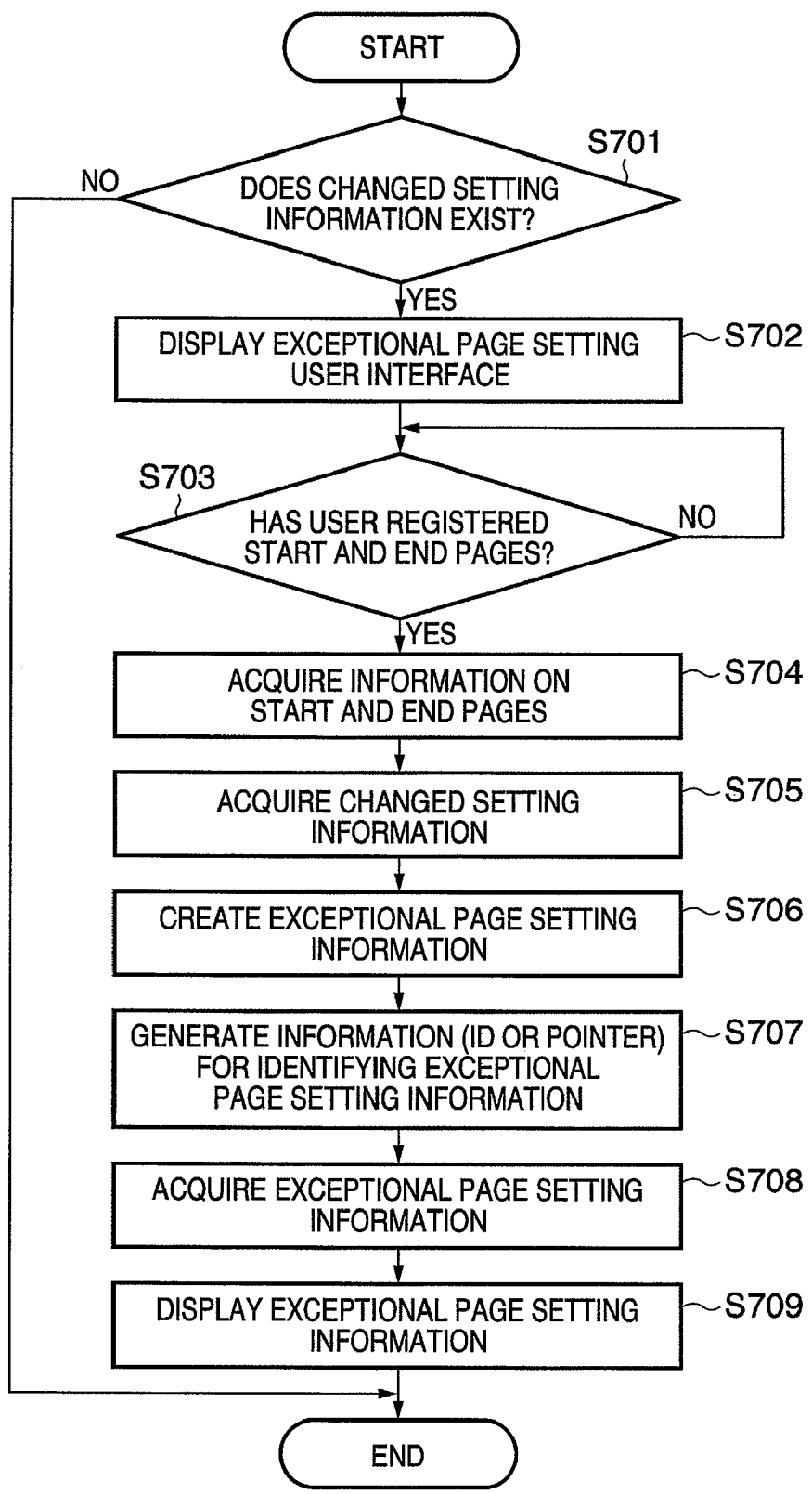
FIG. 7 is a flowchart for explaining the processing sequence of the specific page setting change processor.

The processing sequence of the specific page setting change processor 307 will be explained with reference to the flowchart of FIG. 7 and FIG. 5. The exceptional page designation button 404 set in the common setting user interface 401, and the specific page setting change processor 307 which operates upon pressing the exceptional page designation button 404 are characteristic building elements of the present invention.

If the user presses the exceptional page designation button 404 in the common setting user interface 401 after changing the print setting data 204, an exceptional setting for each page becomes valid. In response to press of the exceptional page designation button 404, the specific page setting change processor 307 starts up.

In step S701, the specific page setting change processor 307 checks whether the changed setting information 303 exists. If the changed setting information 303 exists (YES in S701), the specific page setting change processor 307 instructs the exceptional page user interface display 310 to display the exceptional page setting user interface 405.

In step S702, based on the instruction from the specific page setting change processor 307, the exceptional page user interface display 310 displays the exceptional page setting user interface 405 for designating the setting change application range. The exceptional page setting user interface 405 suffices to designate page information (page numbers), and its display form does not limit the gist of the present invention.

If the user does not change the print setting data 204 and no changed setting information 303 exists (No in S701), the specific page setting change processor 307 does not perform any processing associated with setting change, and the process ends.

In this case, the specific page setting change processor 307 can display, on the monitor 110, notification information to notify the user that he need not change any setting. For example, the specific page setting change processor 307 can display, on the monitor 110, a message such as "no setting has changed, so you need not make exceptional page settings."

If the user designates page information (page numbers) via the exceptional page setting user interface 405 and presses a registration button 501 in step S703 (YES in S703), the process advances to step S704.

In step S704, the specific page setting change processor 307 acquires the page information. For example, the page information (page numbers) includes information on start and end pages for making print settings for each page.

The gist of the present invention is not limited to start and end pages as page information for making print settings for each page. The designation form is arbitrary as long as some of all pages of print data of the document 213 are designated.

In step S705, the specific page setting change processor 307 acquires the changed setting information 303.

In step S706, the specific page setting change processor 307 generates exceptional page setting information 308 by combining (associating) the page information designated by the user and the changed setting information 303, and stores it in the storage device 105. Generation of the exceptional page setting information 308 is different from the processing executed upon changing the print setting data 204 for the pages of entire print data of the document 213.

In S707, the specific page setting change processor 307 generates identification information (ID) or a pointer for identifying the exceptional page setting information generated in S706, and inputs it to the exceptional page user interface display 310. When pieces of exceptional page setting information 308 corresponding to pieces of page information exist, each exceptional page setting information 308 can be associated with the common setting information 304 by using identification information or a pointer.

In step S708, the exceptional page user interface display 310 acquires the exceptional page setting information 308.

In step S709, the specific page setting change processor 307 instructs the subwindow creation unit 309 to display the subwindow (UI) 406. In accordance with the instruction from the specific page setting change processor 307, the subwindow creation unit 309 creates a subwindow (UI) different from the common setting user interface 401 and displays it on the monitor 110.

The subwindow (UI) 406 can be used to display the contents of the exceptional page setting information 308. When the exceptional page setting information 308 is formed from information on a plurality of pages, the subwindow creation unit 309 can generate a plurality of subwindows (UIs) 406 in accordance with the page information and control display of them.

The exceptional page user interface display 310 displays the exceptional page setting information 308 acquired in step S708 in the subwindow (UI) 406.

From the display of the subwindow (UI) 406, the user can identify common settings and exceptional page settings and easily grasp the exceptional page settings.

Then, the specific page setting change processor 307 instructs the changed setting discard processor 306 to discard the changed setting information 303. Processing by the changed setting discard processor 306 is the same as in the case of press of the cancel button 402. As for processing of the changed setting information 303 in the common setting user interface 401, the change of the print setting data 204 is invalidated. Since the changed setting information 303 is discarded, the changed setting reflection processor 305 does not change the common setting information 304.

(Format of Exceptional Page Setting Information)

The formats of the common setting information 304 and exceptional page setting information 308 will be described with reference to FIG. 6.

The common setting information 304 is stored in a data format 601 in the storage device 105. The common setting information 304 is stored as data reflecting initial settings or the changed setting information 303 in the format of the item name, data type, and value in regard to setting items whose settings are changeable in the common setting user interface 401.

The common setting information 304 and the exceptional page setting information 308 (to be described later) may be stored in the table format, in the XML (eXtensible Markup Language) format, or in a structure or the like.

Exceptional page setting information 605 is stored in a data format 602 in the storage device 105. The data format 602 holds page information (start and end pages), and information on items (items different in value from common setting items) whose print settings have changed out of common setting items. The exceptional page setting information 605 is registered as one item of the data format 601. Pointer 1 associates the data format 602 representing the contents of the exceptional page setting information 605 with the data format 601 of the common setting information 304.

Exceptional page setting information 606 is stored in a data format 603 in the storage device 105. The data format 603 holds page information (start and end pages), and information on an item (paper type) whose print setting has changed out of common setting items. The exceptional page setting information 606 is registered as one item of the data format 601. Pointer 2 associates the data format 603 representing the contents of the exceptional page setting information 606 with the data format 601 of the common setting information 304.

Exceptional page setting information 607 is stored in a data format 604 in the storage device 105. The data format 604 holds page information (start and end pages), and information on an item (color) whose print setting has changed out of common setting items. The exceptional page setting information 607 is registered as one item of the data format 601. Pointer 3 associates the data format 604 representing the contents of the exceptional page setting information 607 with the data format 601 of the common setting information 304.

A pointer (or identification information) associates common setting information with exceptional page setting information. Even when pieces of exceptional page setting information are created, the user can use the pointer (or identification information) to identify each exceptional page setting information among common setting information and refer to its contents.

Figure 6:
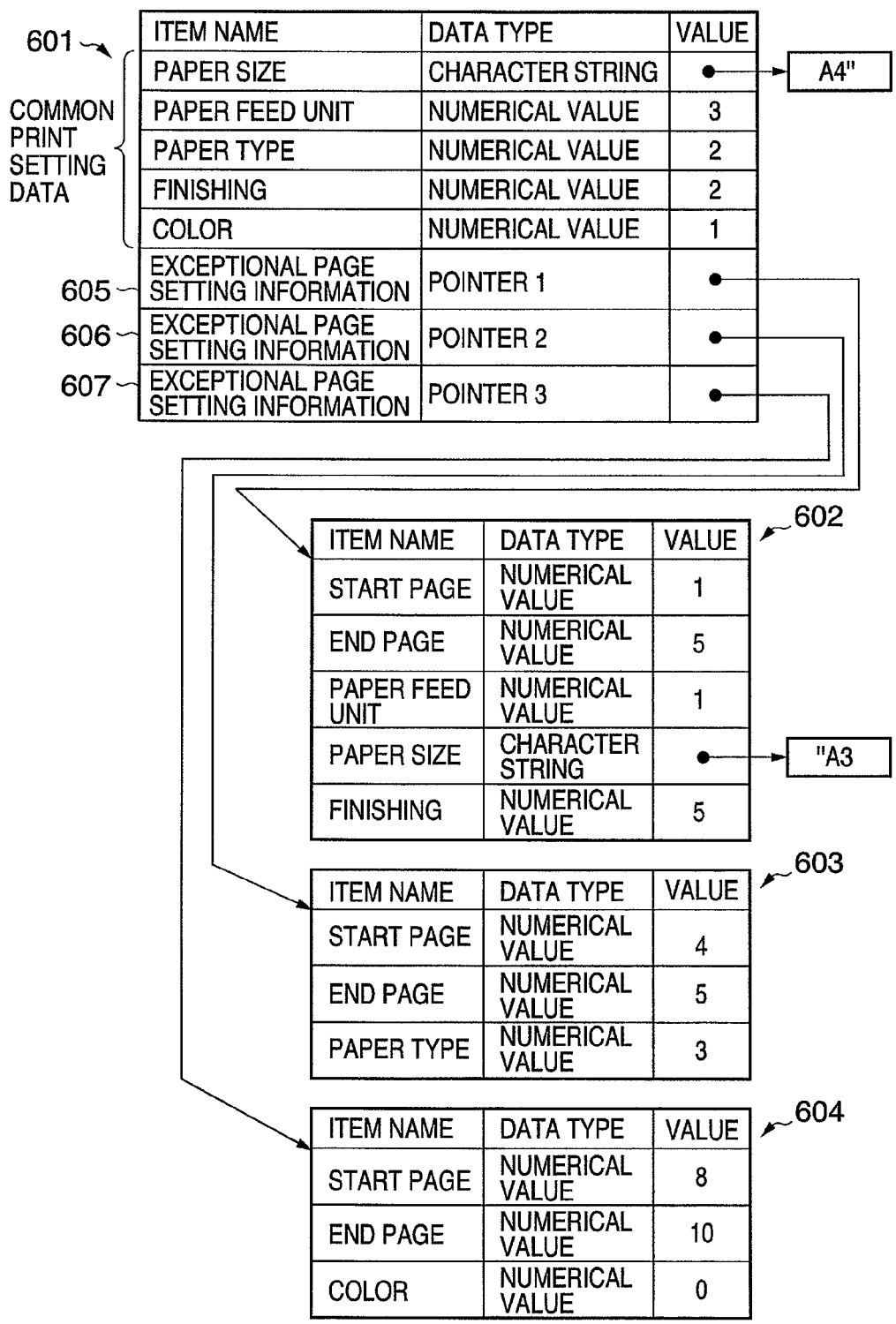
FIG. 6 is view for explaining the formats of common setting information 304 and exceptional page setting information 308.
Figure 8:
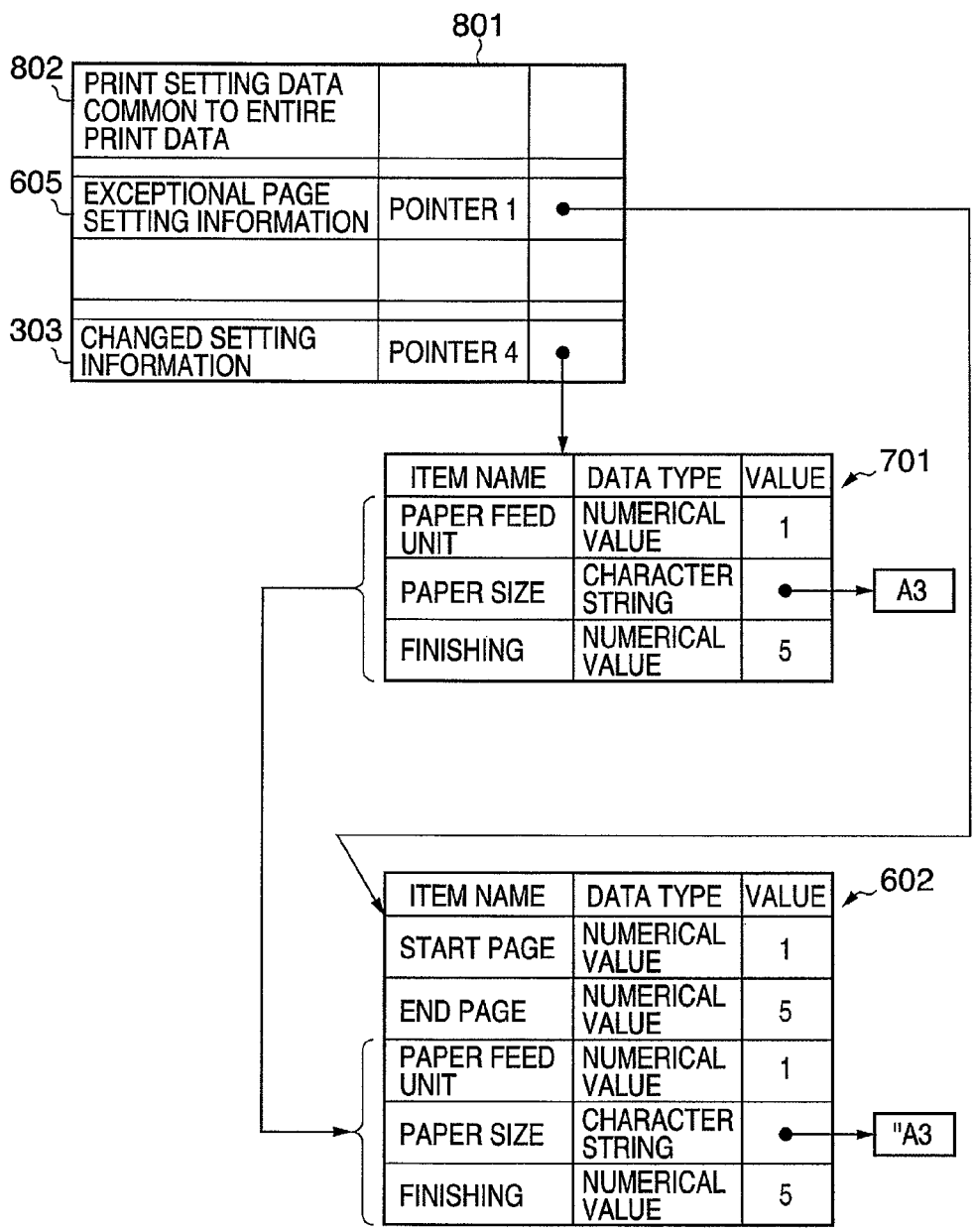
FIG. 8 is a view showing a data format obtained by adding changed setting information 303 to a data format 601 of common setting information shown in FIG. 6.

As the data format of the common setting information 304, as shown in FIG. 8, the changed setting information 303 may be added to the data format 601 of common setting information shown in FIG. 6.

A data format 801 stores common print setting data 802, the exceptional page setting information 605 containing print settings changed for each page, and the changed setting information 303. For descriptive convenience, the pieces of exceptional page setting information 606 and 607 are not illustrated.

The changed setting information 303 records, in a data format 701, items and values changed by the user via the common setting user interface 401. This data format is the same as the data format 601 of the common setting information 304 described above. The changed setting information 303 holds setting data of "paper feed unit", "paper size", and "finishing" as changed print setting data. These contents coincide with the setting data of the exceptional page setting information 605 in the data format 602.

The changed setting information 303 is registered as one item of the data format 801. Pointer 4 associates the data format 701 representing the contents of the changed setting information 303 with the data format 801 of the common setting information 304.

Similar to FIG. 6, the data format shown in FIG. 8 may be the table format, the XML (eXtensible Markup Language) format, or storage in a structure or the like.

(Concrete Example of Updating Common Setting Information)

Figure 9:
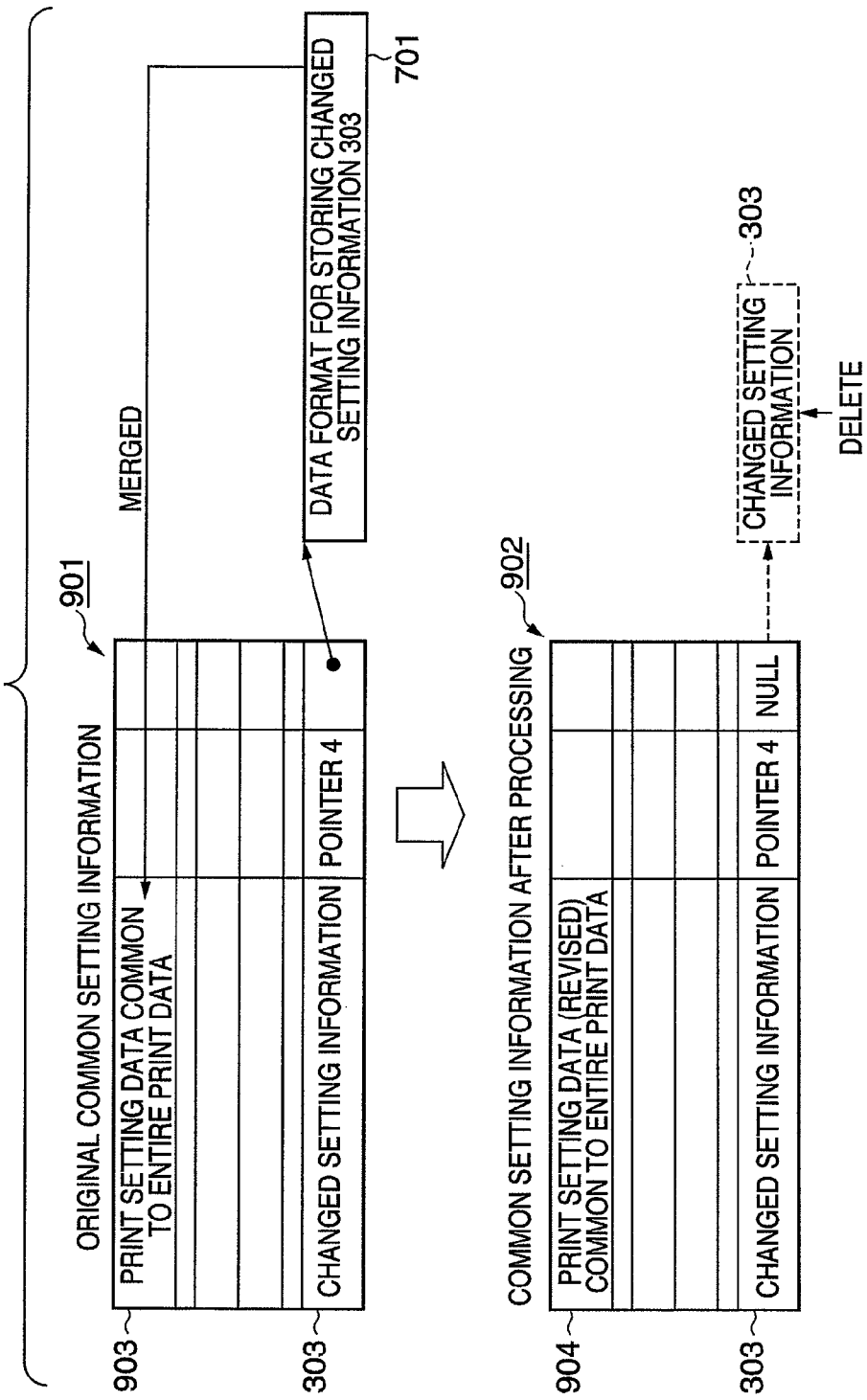
FIG. 9 is a view showing a concrete example of updating common setting information.
Figure 12:
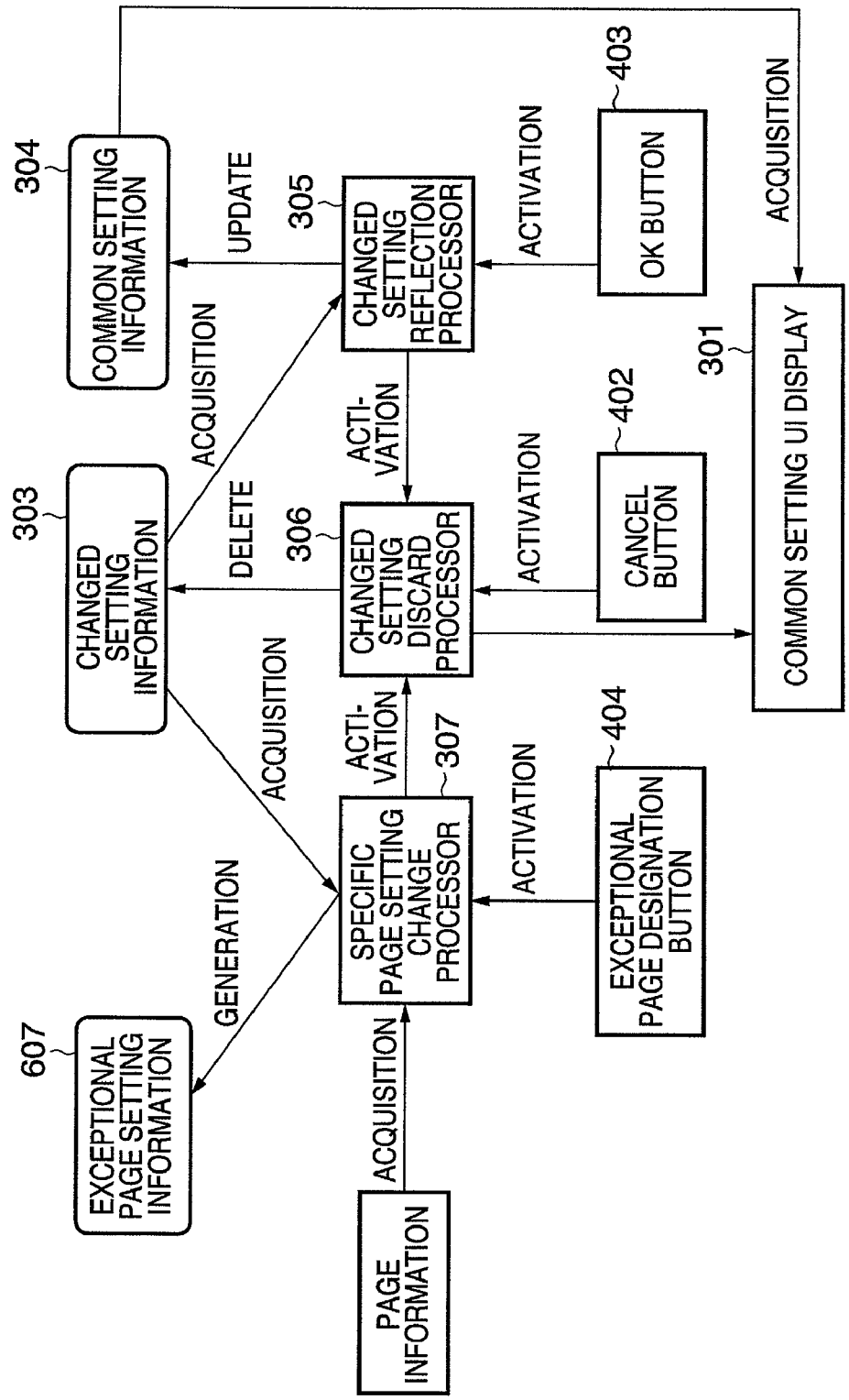
FIG. 12 is a view for explaining cooperation between processes by a specific page setting change processor 307, changed setting discard processor 306, and changed setting reflection processor 305 in the presence of the changed setting information 303.

FIG. 9 is a view showing a concrete example of changing common setting information. FIG. 12 is a view for explaining cooperation between processes by the specific page setting change processor 307, changed setting discard processor 306, and changed setting reflection processor 305 in the presence of the changed setting information 303.

In FIG. 9, a data format 901 of the original common setting information 304 representing a state before pressing the OK button 403 holds print setting data 903 common to entire print data of the document 213, and the changed setting information 303 corresponding to setting change.

If the user changes print setting data via the common setting user interface 401 and presses the OK button 403 meaning finalization of the change, the changed setting reflection processor 305 starts up. The changed setting reflection processor 305 acquires the changed setting information 303, and updates the common print setting data 903 (corresponding to the common setting information 304) by reflecting the items of the changed setting information 303 in it.

By reflecting the changed setting information 303, the common print setting data 903 is updated to print setting data (revised) 904 common to entire print data.

When the changed setting information 303 is made up of changed information on the paper feed unit, paper size, and finishing, the items of the paper size, paper feed unit designation, and finishing in the common print setting data (revised) 904 are reflected as changes of the print settings of all pages.

Information on setting items different between the common print setting data 903 and the common print setting data (revised) 904 is the changed setting information 303.

After the end of processing to reflect the changed setting information 303 in the common print setting data (revised) 904, the changed setting reflection processor 305 activates the changed setting discard processor 306. The changed setting discard processor 306 discards (deletes) the changed setting information 303. The changed setting discard processor 306 sets pointer 4 to NULL in order to cancel the association between the common print setting data (revised) 904 and the changed setting information 303. Then, the processing ends.

(Concrete Example of Canceling Change of Common Setting Information)

Figure 10:
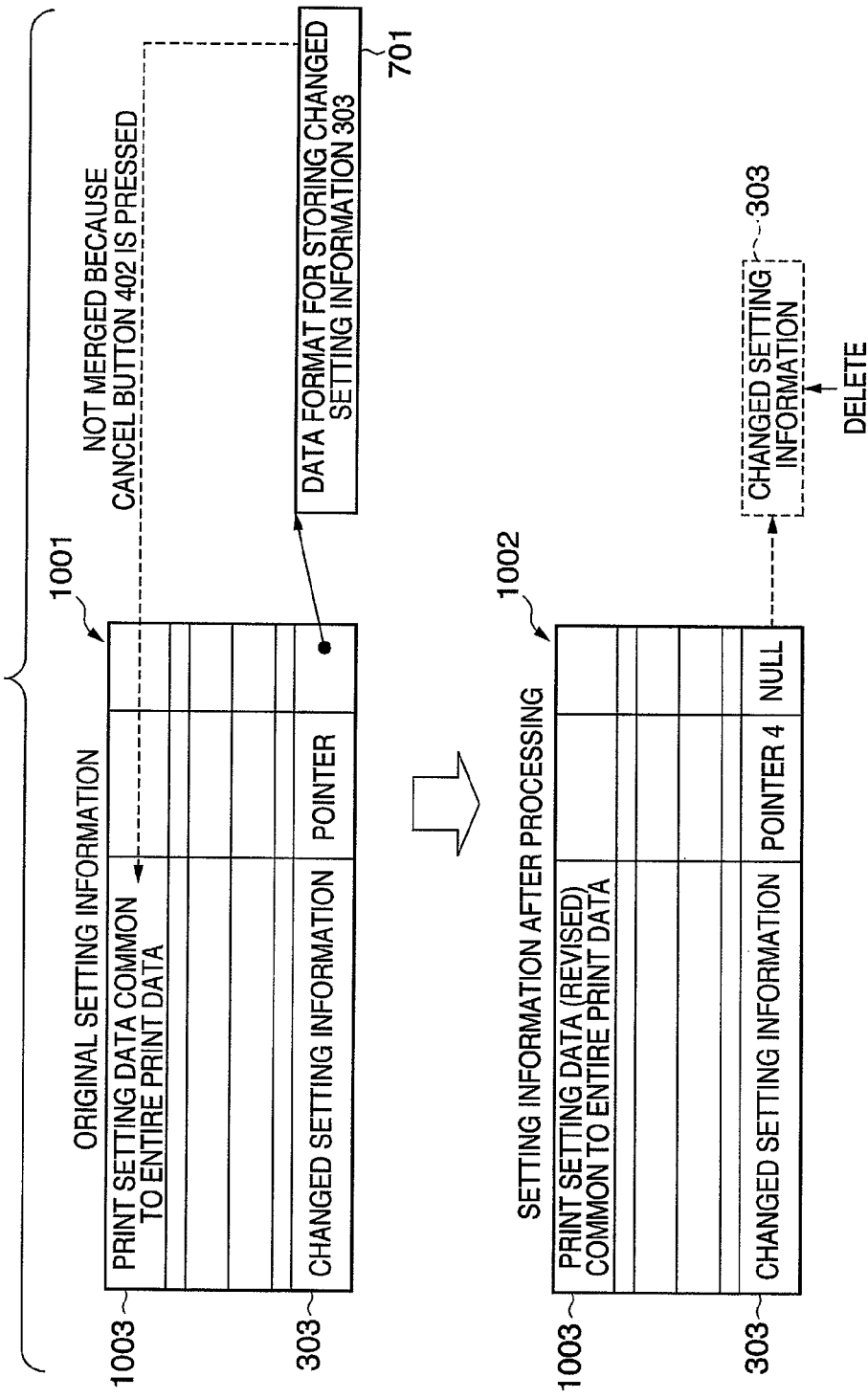
FIG. 10 is a view showing a concrete example of canceling change of common setting information.

FIG. 10 is a view showing a concrete example of canceling change of common setting information. A data format 1001 of the original common setting information 304 representing a state before pressing the cancel button 402 holds print setting data 1003 common to entire print data of the document 213, and the changed setting information 303 corresponding to setting change.

If the user presses the cancel button 402, the changed setting discard processor 306 starts up and discards (deletes) the changed setting information 303. The changed setting discard processor 306 instructs the common setting UI display 301 to display the common setting user interface 401 reflecting print setting data 1003 (corresponding to the common setting information 304) common to entire print data.

By pressing the cancel button 402, neither the changed setting reflection processor 305 starts up, nor the changed setting information 303 is reflected in the common print setting data 1003. The common setting UI display 301 refers to the common setting information 304 before change, and the common setting user interface 401 returns to a state before change under display control of the common setting UI display 301.

The changed setting discard processor 306 sets pointer 4 to NULL in order to cancel the association between the common print setting data 1003 and the changed setting information 303. Then, the processing ends.

In the processes of FIGS. 9 and 10, no exceptional page setting information is generated. These processes are the same as processing by the printer driver for a printing apparatus having no exceptional page processing function.

(Concrete Example of Changing Settings of Each Page)

Figure 11:
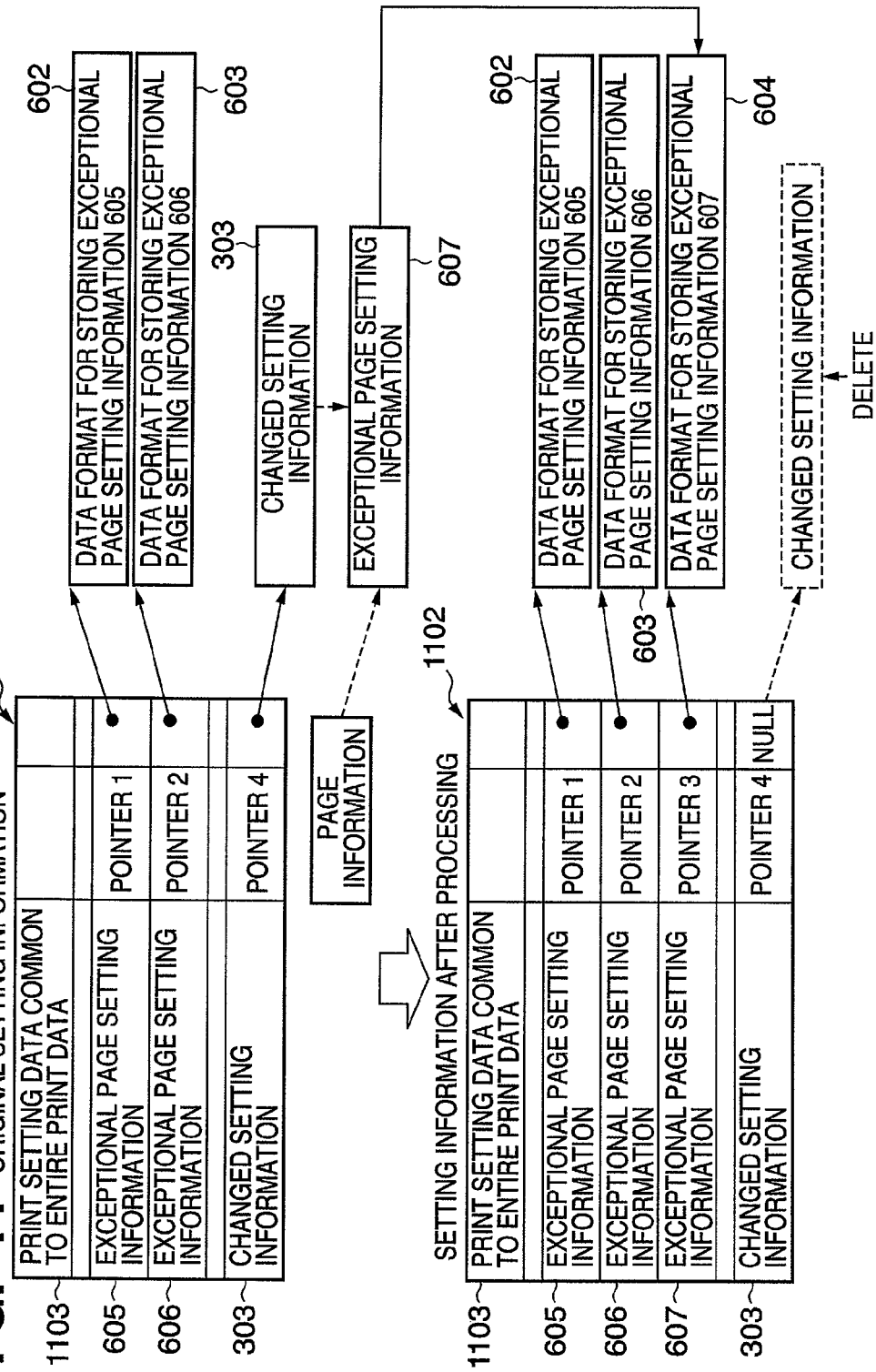
FIG. 11 is view showing a concrete example of changing the settings of each page.

FIG. 11 is view showing a concrete example of changing the settings of each page. Assume that the user changes print setting data via the common setting user interface 401. In FIG. 11, a data format 1101 of original common setting information representing a state before press of the exceptional page designation button 404 contains print setting data 1103 common to entire print data of the document 213, and the changed setting information 303 corresponding to setting change. The pieces of exceptional page setting information 605 and 606 are registered as respective items of the data format 1101. Pointers 1 and 2 associate the data formats 602 and 603 (see FIG. 6 for concrete contents) for storing the pieces of exceptional page setting information 605 and 606, with the print setting data 1103 (corresponding to the common setting information 304).

If the user presses the exceptional page designation button 404 meaning that change of print setting data is reflected in the print settings of each page, the specific page setting change processor 307 starts up. The specific page setting change processor 307 acquires the changed setting information 303, and page information (start and end page numbers) which is input via the exceptional page setting user interface 405 and represents the setting change application range. The specific page setting change processor 307 generates new exceptional page setting information 607 from the page information (start and end page numbers) and the changed setting information 303. The new exceptional page setting information 607 is stored in the data format 604 (see FIG. 6 for concrete contents). The exceptional page setting information 607 is registered as one item of a new data format 1102 generated upon pressing the exceptional page designation button 404. Pointer 3 associates the data format 604 for storing the exceptional page setting information 607, with the print setting data 1103 (corresponding to the common setting information 304).

After the end of processing to generate and store new exceptional page setting information, the specific page setting change processor 307 activates the changed setting discard processor 306. The changed setting discard processor 306 discards (deletes) the changed setting information 303. The changed setting discard processor 306 sets pointer 4 to NULL in order to cancel the association between the common print setting data 1003 and the changed setting information 303. Then, the processing ends. Note that the common print setting data 1103 is not updated before and after change processing.

According to the first embodiment, the print settings of each page can be made with high operability because an interface aiming at the print settings of entire print data is commonly used for the print settings of each page.

According to the first embodiment, the user can easily grasp the result of changing the print settings of each page by displaying it on an interface different from one aiming at the print settings of entire print data.

According to the first embodiment, the development efficiency of a print control program can increase by commonly using an interface aiming at the print settings of entire print data for the print settings of each page.

Second Embodiment

In the first embodiment, information of changed items among setting items displayed on the common setting user interface 401 is set as the changed setting information 303, and exceptional page setting information is generated from a combination with page information. Setting items displayed on the common setting user interface 401 can be selected and set arbitrarily by the user. However, not all printing apparatuses can switch all setting items for each page, and functions settable for each page differ between printing apparatus models.

The second embodiment will explain change of print setting data of each page when the functions of a printing apparatus differ between models.

Figure 14:
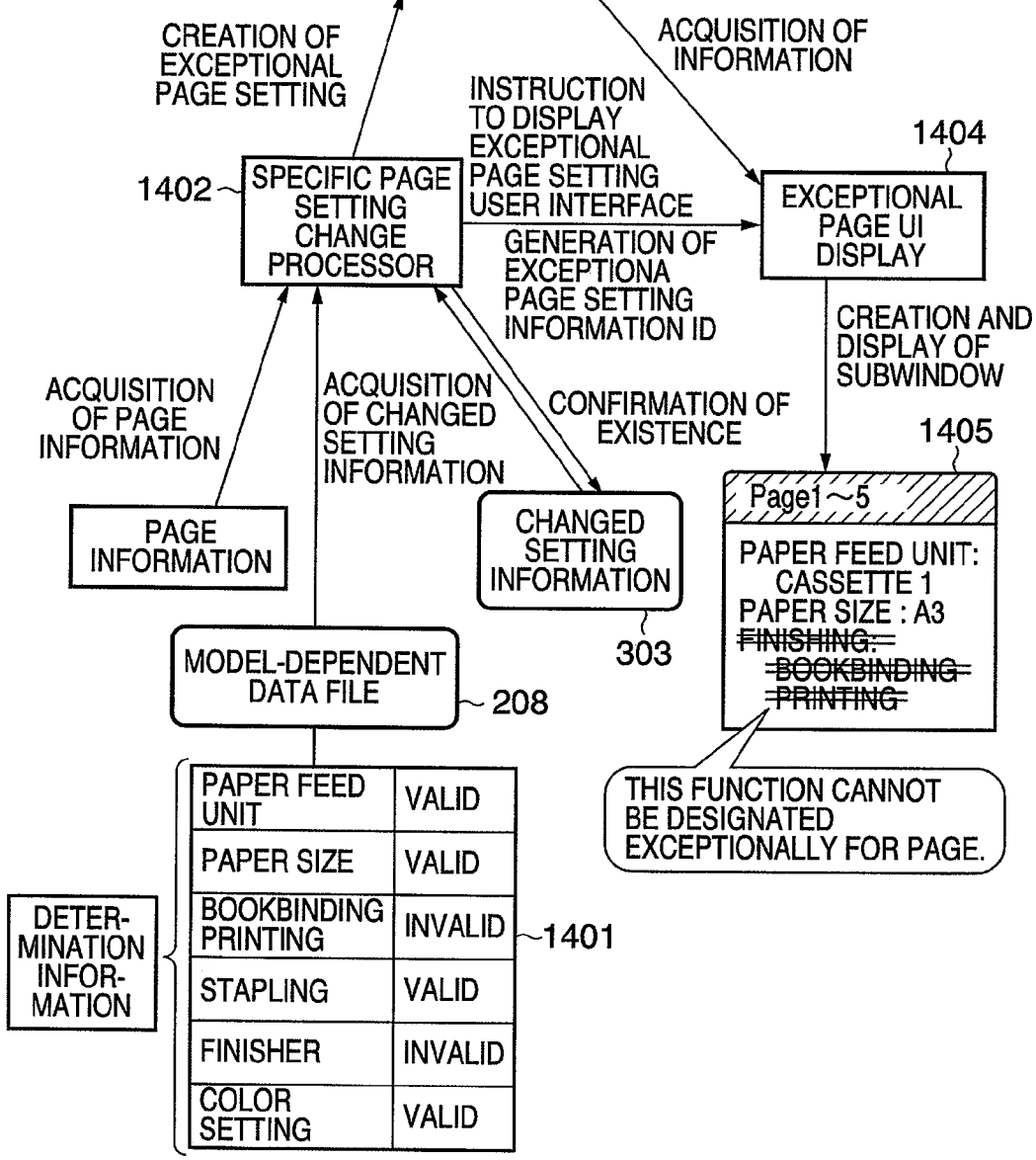
FIG. 14 is a view for explaining processes by a specific page setting change processor 1402 and exceptional page UI display 1404 according to the second embodiment.

FIG. 14 is a view for explaining processing by a specific page setting change processor 1402 and exceptional page UI display 1404 according to the second embodiment. FIG. 14 corresponds to FIG. 5 in the first embodiment, a common description will not be repeated, and only a difference will be described.

A printer driver 114 has a model-dependent data file 208 as shown in FIG. 2. The specific page setting change processor 1402 can refer to the model-dependent data file 208.

The model-dependent data file 208 has, in a table 1401, determination information for determining whether the print setting of each item in common setting information 304 can be changed for each page (setting of a specific page).

Information ("valid") representing that setting of a specific page is possible, or information ("invalid") representing that setting of a specific page is impossible is set as a model-dependent setting item in the table 1401.

In the table 1401, "valid" representing that setting of a specific page is possible is set in setting items "paper feed unit", "paper size", "stapling", and "color setting".

To the contrary, "invalid" representing that setting of a specific page is impossible is set in setting items "bookbinding printing" and "finisher".

The table 1401 exemplifies model-dependent information of an arbitrary printing apparatus. If the model of printing apparatus changes, the contents of determination information for determining whether setting of a specific page is possible also change.

Exceptional page setting information 1403 can hold determination information ("valid" or "invalid") of the model-dependent data file 208 for each setting item, unlike the exceptional page setting information 308 according to the first embodiment.

The specific page setting change processor 1402 generates the exceptional page setting information 1403 by using changed setting information 303, page information (start and end page numbers), and determination information of the model-dependent data file 208.

For example, when the changed setting information 303 contains items "paper feed", "paper size", and "finishing", determination information on these items out of determination information of the model-dependent data file 208 is registered in the exceptional page setting information 1403. In the exceptional page setting information 1403, the paper feed unit="valid", the paper size="valid", and the finishing (finisher)="invalid" are registered.

When displaying the exceptional page setting information 1403 in a subwindow (UI) 1405, the exceptional page UI display 1404 can control the display reflecting determination information ("valid"/"invalid" information) of each setting item. For example, the exceptional page UI display 1404 can notify the user of a setting item whose determination information is "invalid", by using a combination of a double-lined display and a warning display (e.g., "this function cannot be set exceptionally for a page"). The "double line" is merely an example of the display representing that determination information "invalid" is registered. The display is not limited to the "double line" as long as "valid" and "invalid" can be discriminated.

According to the second embodiment, the user can easily grasp the result of changing the print settings of each page reflecting model-dependent information.

Other Embodiments

The object of the present invention is also achieved by supplying a storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-341941, filed Dec. 19, 2006, which is hereby incorporated by reference herein in its entirety.

What is claimed is:

1. An information processing apparatus which creates print data to be processed by a printing apparatus, comprising:
    a common setting unit adapted to accept change of a print setting to the entire print data via a print setting window for making a print setting, and store the print setting as common setting information;
    a display control unit adapted to, when change of a print setting is designated via the print setting window for page of the print data, display a page designation window for designating page information to which the change of the print setting accepted via the print setting window is applied; and
    a specific page setting unit adapted to generate exceptional page setting information based on a combination of the page information designated via the page designation window and the print setting accepted via the print setting window, wherein the print setting window accepts, within the same window, change of a print setting to the entire print data and change of a print setting to specific page information.

2. The apparatus according to claim 1, wherein when change of a print setting is designated for page, said display control unit displays contents of the exceptional page setting information in an exceptional content display window for an item changed from the common setting information.

3. The apparatus according to claim 1, wherein when change of a print setting is designated via the print setting window for page, said specific page setting unit generates exceptional page setting information from the print setting accepted via the print setting window, and said display control unit reads the common setting information stored in said common setting unit, and reflects and displays the common setting information in the print setting window.

4. The apparatus according to claim 1, further comprising a discard unit adapted to discard the print setting accepted via the print setting window,
wherein after said specific page setting unit generates the exceptional page setting information, said discard unit discards the accepted print setting.

5. The apparatus according to claim 1, wherein the page information is designated by information on a start page and information on an end page to which the change of the print setting is applied.

6. A control method of creating print data to be processed by a printing apparatus, comprising:
a common setting step of causing a common setting unit to accept change of a print setting to the entire print data via a print setting window for making a print setting, and store the print setting as common setting information;
a display control step of, when change of a print setting is designated via the print setting window for page of the print data, causing a display control unit to display a page designation window for designating page information to which the change of the print setting accepted via the print setting window is applied; and
a specific page setting step of causing a specific page setting unit to generate exceptional page setting information based on a combination of the page information designated via the page designation window and the print setting accepted via the print setting window,
wherein the print setting window accepts, within the same window, change of a print setting to the entire print data and change of a print setting to specific page information.

7. The method according to claim 6, wherein in the display control step, when change of a print setting is designated for page, contents of the exceptional page setting information are displayed in an exceptional content display window for an item changed from the common setting information.

8. The method according to claim 6, wherein when change of a print setting is designated via the print setting window for page, exceptional page setting information is generated in the specific page setting step from the print setting accepted via the print setting window, and the common setting information stored in the common setting step is read, reflected, and displayed in the print setting window in the display control step.

9. The method according to claim 6, further comprising a discard step of causing a discard unit to discard the print setting accepted via the print setting window,
wherein after the exceptional page setting information is generated in the specific page setting step, the accepted print setting is discarded in the discard step.

10. The method according to claim 6, wherein the page information is designated by information on a start page and information on an end page to which the change of the print setting is applied.

11. A control program which is stored in a non-transitory computer-readable storage medium to cause a computer to execute a control method defined in claim 6.

* * * * *